(12) United States Patent
Henigman et al.

(10) Patent No.: US 7,840,607 B2
(45) Date of Patent: Nov. 23, 2010

(54) DATA MART GENERATION AND USE IN ASSOCIATION WITH AN OPERATIONS INTELLIGENCE PLATFORM

(75) Inventors: Timothy James Henigman, Huntington Beach, CA (US); Jesse G. DeMesa, Lake Forest, CA (US)

(73) Assignee: Siemens Aktiengesellschaft, Munich (DE)

( * ) Notice: Subject to any disclaimer, the term of this patent is extended or adjusted under 35 U.S.C. 154(b) by 605 days.

(21) Appl. No.: 11/195,439

(22) Filed: Aug. 2, 2005

(65) Prior Publication Data

US 2006/0031250 A1 Feb. 9, 2006

Related U.S. Application Data

(60) Provisional application No. 60/599,478, filed on Aug. 6, 2004.

(51) Int. Cl.
G06F 17/30 (2006.01)
G06F 7/00 (2006.01)
(52) U.S. Cl. .................. 707/803; 707/751; 707/955; 707/957
(58) Field of Classification Search .................. None
See application file for complete search history.

(56) References Cited

U.S. PATENT DOCUMENTS

| | | | |
|---|---|---|---|
| 5,907,704 A | | 5/1999 | Gudmundson et al. |
| 5,970,476 A | * | 10/1999 | Fahey .................. 705/28 |
| 5,982,362 A | | 11/1999 | Crater et al. |
| 6,003,036 A | * | 12/1999 | Martin .................. 707/102 |
| 6,198,480 B1 | | 3/2001 | Cotugno et al. |
| 6,223,182 B1 | | 4/2001 | Agarwal et al. |
| 6,336,138 B1 | | 1/2002 | Caswell et al. |
| 6,381,605 B1 | | 4/2002 | Kothuri et al. |
| 6,430,565 B1 | * | 8/2002 | Berger et al. .................. 707/101 |
| 6,480,836 B1 | * | 11/2002 | Colby et al. .................. 707/3 |
| 6,505,205 B1 | | 1/2003 | Kothuri et al. |
| 6,505,246 B1 | | 1/2003 | Land et al. |
| 6,609,123 B1 | | 8/2003 | Cazemier et al. |
| 6,700,590 B1 | | 3/2004 | DeMesa et al. |
| 6,704,743 B1 | | 3/2004 | Martin |
| 6,751,657 B1 | | 6/2004 | Zothner |
| 6,842,774 B1 | | 1/2005 | Piccioni |
| 6,952,705 B2 | * | 10/2005 | Knoblock et al. ....... 707/103 R |
| 6,996,566 B1 | | 2/2006 | George et al. |
| 7,069,514 B2 | * | 6/2006 | DeMesa et al. .............. 715/744 |

(Continued)

*Primary Examiner*—Greta L Robinson
*Assistant Examiner*—James J Wilcox
(74) *Attorney, Agent, or Firm*—Buckley, Maschoff & Talwalkar LLC

(57) ABSTRACT

Some embodiments include determination and storage of a plurality of relational database tables based on class model representing tag-based data and non-tag-based data and on a plurality of objects instantiated based on the class model. Also included are reception of a selection of one object of the objects as a dimension of a logical model, reception of a first indication of a first plurality of members of the selected object to be associated with dimension data of the logical model, reception of a second indication of a second plurality of members of the selected object to be associated with fact data of the logical model, to create a dimension table associated with the selected object and including columns corresponding to the first plurality of members, and creation of a fact table including a foreign key column corresponding to the dimension table and including a column corresponding to each of the second plurality of members.

27 Claims, 16 Drawing Sheets

U.S. PATENT DOCUMENTS

| | | | |
|---|---|---|---|
| 7,133,865 B1 * | 11/2006 | Pedersen et al. | 707/3 |
| 7,275,024 B2 * | 9/2007 | Yeh et al. | 703/2 |
| 7,523,111 B2 | 4/2009 | Walmsley | |
| 2001/0040591 A1 | 11/2001 | Abbott et al. | |
| 2002/0099499 A1 | 7/2002 | Takayama et al. | |
| 2002/0169867 A1 | 11/2002 | Mann et al. | |
| 2002/0184610 A1 | 12/2002 | Chong et al. | |
| 2003/0055832 A1 * | 3/2003 | Roccaforte | 707/100 |
| 2003/0058277 A1 | 3/2003 | Bowman-Amuah | |
| 2003/0105857 A1 | 6/2003 | Kamen et al. | |
| 2003/0139968 A1 | 7/2003 | Ebert | |
| 2004/0036716 A1 | 2/2004 | Jordahl | |
| 2004/0059436 A1 | 3/2004 | Anderson et al. | |
| 2004/0117393 A1 | 6/2004 | DeMesa et al. | |
| 2004/0162834 A1 | 8/2004 | Aono et al. | |
| 2004/0215626 A1 * | 10/2004 | Colossi et al. | 707/100 |
| 2004/0220972 A1 * | 11/2004 | Bhattacharjee et al. | 707/200 |
| 2004/0243281 A1 | 12/2004 | Fujita et al. | |
| 2005/0021622 A1 | 1/2005 | Cullen | |
| 2005/0044097 A1 | 2/2005 | Singson et al. | |
| 2005/0065910 A1 * | 3/2005 | Welton et al. | 707/2 |
| 2005/0071749 A1 | 3/2005 | Goerke et al. | |
| 2005/0143969 A1 | 6/2005 | DeMesa et al. | |
| 2005/0144154 A1 | 6/2005 | DeMesa et al. | |
| 2005/0172306 A1 | 8/2005 | Agarwal et al. | |
| 2005/0216555 A1 | 9/2005 | English et al. | |
| 2005/0246627 A1 | 11/2005 | Sayed | |
| 2005/0251571 A1 | 11/2005 | Karstens | |
| 2006/0067334 A1 | 3/2006 | Ougarov et al. | |
| 2006/0074505 A1 | 4/2006 | Kline, Jr. | |
| 2006/0116994 A1 | 6/2006 | Jonker et al. | |
| 2006/0123019 A1 | 6/2006 | Nguyen et al. | |
| 2006/0136583 A1 | 6/2006 | Helmstetter et al. | |
| 2006/0161597 A1 | 7/2006 | Ougarov et al. | |
| 2006/0200741 A1 | 9/2006 | DeMesa | |
| 2006/0218116 A1 | 9/2006 | O'Hearn et al. | |
| 2006/0218131 A1 | 9/2006 | Brenes et al. | |
| 2006/0294199 A1 | 12/2006 | Bertholf | |
| 2007/0118599 A1 | 3/2007 | Castanho et al. | |
| 2007/0124209 A1 | 5/2007 | Walker et al. | |
| 2007/0208574 A1 | 9/2007 | Zheng et al. | |
| 2007/0239741 A1 | 10/2007 | Jordahl | |
| 2008/0103786 A1 | 5/2008 | Zhang et al. | |

* cited by examiner

| Work_Order_Task_Key | Component_Number | Component_Type | Crew | Division | Equipment_Number | Job_Type |
|---|---|---|---|---|---|---|
|  |  |  |  |  |  |  |
|  |  |  |  |  |  |  |

| Date_Key | Full_Date | Day_Of_Week | Day_Of_Month | Day_Of_Year | Week_of_Month | Week_of_Year |
|---|---|---|---|---|---|---|
| | | | | | | |
| | | | | | | |

| Date_Key | Work_Order_Task_Key | Act_Start_Date | Act_Start_Time | Completion_Date | Completion_Time | Work_Date | Work_Task_Status |
|---|---|---|---|---|---|---|---|
| | | | | | | | |
| | | | | | | | |

DATA MART GENERATION AND USE IN ASSOCIATION WITH AN OPERATIONS INTELLIGENCE PLATFORM

CROSS REFERENCE TO RELATED APPLICATIONS

This application claims priority to Provisional Application Ser. No. 60/599,478, filed Aug. 6, 2004 and entitled "Data Mart Generation for Real-Time Operations Decision Support and Analysis".

BACKGROUND

1. Field

The embodiments described below relate generally to systems for storing and providing historical operations data.

2. Discussion

Conventional industrial systems often rely to some extent on computer-based automation and monitoring. In some examples of automation and monitoring, data arising from the operation of a manufacturing plant is acquired, analyzed and responded to if necessary. The data may arise from independent sources, with each source configured to provide substantially raw or native "point" data at pre-defined intervals in real or near real-time. The point data may be presented to an operator in real or near-real time, and may include such as numerical values produced by gauges and/or monitors (e.g., speed, temperature, or pressure).

Examples of systems that may acquire, analyze, and act on point data include industrial automation systems, supervisory control and data acquisition (SCADA) systems, and general data acquisition systems. In such systems, point data may be associated with a "tag" to create a structural data element that is made accessible to other components, systems, applications and/or users. In general, point data obtained from selected sources is subject to dynamic change and is monitored and reported through various operations and functions associated with processing the point data. In industrial automation and control systems, decision support and reporting capabilities may be provided based on tag-associated point data that is monitored over very short timeframes ranging in the sub-second to sub-minute range.

Many conventional systems provide only limited capabilities to access, interpret, and/or manipulate tag-based point data collectively or in connection with "non-point" data. Non-point data relates to a broad category of context-providing information that is associated with point data and may extend the functionality and meaning of the point data. Non-point data may include descriptive and/or attribute information characterizing the point data, as well as, other information such as limits, ranges, etc. In conventional systems, integral and flexible manipulation of tag-based point data and non-point data is restricted due to the inherent differences between and properties of the two types of data.

Conventional systems also possess a limited ability to integrate and relate tag-based point data and non-tag-based data. Non-tag-based data may originate from numerous sources and relate to disparate aspects of an enterprise environment. For example, non-tag-based data may comprise data associated with conventional database applications/environments and include transactional information, production data, business data, etc. Conventionally, attempts to integrate non-tag-based data with tag-based point data may be hindered or prevented completely as a consequence of underlying differences in structure and content between these data types. As a result, generating and implementing logical constructions or schema in which both tag-based data and non-tag-based data are integrally used is problematic in conventional systems. Such limitations limit overall flexibility and increase the difficulty of scaling to complex, enterprise-level environments.

Another important consideration to the integral management of point data and non-point data relates to the recognition of differences in desirable update or acquisition frequencies. The dynamic properties of point data give rise to time critical retrieval restrictions on systems designed to acquire and evaluate point data. Rapidly-changing point data is generally acquired or refreshed at a high frequency to insure that the information is up-to-date. Other point data and non-point data may be more static in nature and may not require high-frequency acquisition.

Conventional systems are not well suited to provide integration of customizable data-dependent acquisition strategies or associated acquisition rates. As a result, these systems experience reduced performance, especially in complex environments where data or values to be retrieved possess different optimal or desired refresh rates. Furthermore, these conventional systems fail to provide the ability to efficiently customize or configure differential acquisition strategies for point data and non-point data so as to improve overall system performance.

The foregoing difficulties in managing tag-based point data, non-point data, and non-tag-based data also hinder efficient analysis and reporting of such data. Conventional systems such as those described above may therefore not be suitable for historical analysis and evaluation of acquired data. Accordingly, improved systems for analysis, manipulation and/or reporting of operations data are desired.

SUMMARY

In order to address the foregoing, some embodiments concern a system, a method, an apparatus, a medium storing processor-executable process steps, and means to determine a plurality of relational database tables based on a class model representing tag-based data and non-tag-based data and on a plurality of objects instantiated based on the class model, to receive a selection of one object of the objects as a dimension of a logical model, to receive a first indication of a first plurality of members of the selected object to be associated with dimension data of the logical model, and to receive a second indication of a second plurality of members of the selected object to be associated with fact data of the logical model. Embodiments may further include creation of a dimension table associated with the selected object and including columns corresponding to the first plurality of members, and creation of a fact table including a foreign key column corresponding to the dimension table and including a column corresponding to each of the second plurality of members. According to some embodiments, the class model represents assets and geographies of a manufacturing organization and/or the tag-based data and non-tag-based data are generated by a continuous industrial process.

In further aspects, a selection of a second object of the objects is received as a second dimension of a logical model, a third indication is received of a first plurality of members of the second object to be associated with dimension data of the logical model, a fourth indication is received of a second plurality of members of the second object to be associated with fact data of the logical model, and a second dimension table is created associated with the second object and including columns corresponding to the first plurality of members of the second object. The fact table may include a second foreign key column corresponding to the second dimension table and a column corresponding to each of the second plurality of members of the second object.

According to additional or alternative aspects, the dimension table includes a primary key column, and a function is created to receive values of one or more columns of the dimension table and to output a value of the primary key column of the dimension table, wherein the value identifies a row of the dimension table including the received values.

Some embodiments comprise an operations platform to provide a class-based model representing tag-based data and non-tag-based data and a plurality of objects instantiated based on the class model, a database device to determine and store a plurality of relational database tables based on the class model and on the plurality of objects instantiated based on the class model, and a schema generating device. The schema generating device is to receive a selection of one object of the objects as a dimension of a logical model, to receive a first indication of a first plurality of members of the selected object to be associated with dimension data of the logical model, to receive a second indication of a second plurality of members of the selected object to be associated with fact data of the logical model, to create a dimension table associated with the selected object and including columns corresponding to the first plurality of members, and to create a fact table including a foreign key column corresponding to the dimension table and including a column corresponding to each of the second plurality of members.

The appended claims are not limited to the disclosed embodiments, however, as those in the art can readily adapt the teachings herein to create other embodiments and applications.

BRIEF DESCRIPTION OF THE DRAWINGS

The construction and usage of embodiments will become readily apparent from consideration of the following specification as illustrated in the accompanying drawings, in which like reference numerals designate like parts, and wherein:

FIG. 11 is a representation of a Work_Order_Task dimension table according to some embodiments;

FIG. 12 is a representation of a Date dimension table according to some embodiments;

FIG. 13 is a representation of a fact table according to some embodiments;

DETAILED DESCRIPTION

Figure 1:
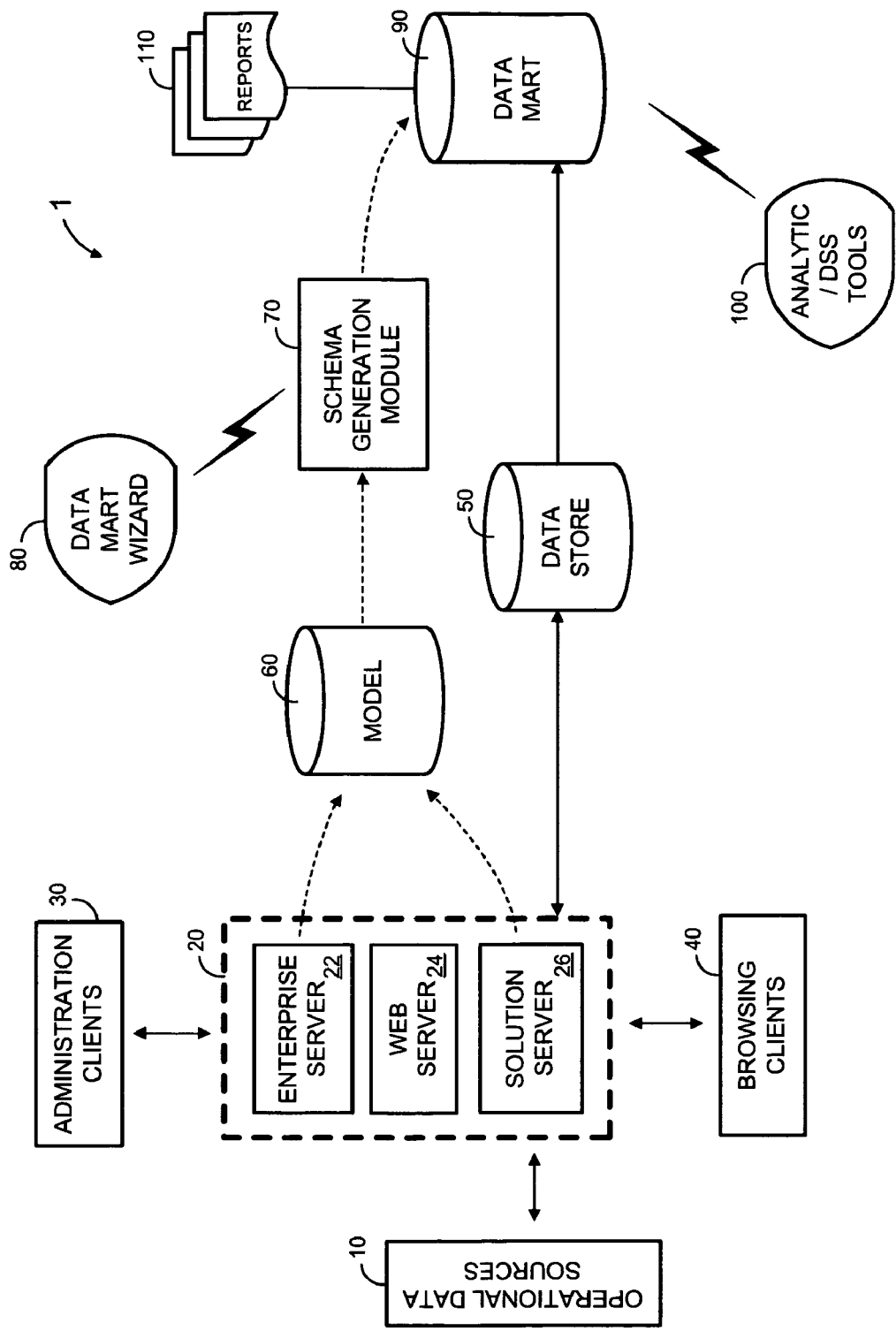
FIG. 1 is a block diagram of a system architecture according to some embodiments.

FIG. 1 illustrates an architecture of system 1 according to some embodiments. Other architectures may be used in conjunction with other embodiments. System 1 may be used to aggregate real and/or near-real time operations data based on a component model. Such a component model represents tag-based operations data and non-tag-based operations data that are generated by an industrial process. System 1 may provide the operations data within relational tables that are accessible using currently- or hereafter-known Data Mart/Warehouse-based techniques. The operations data may represent any type of industrial/manufacturing process, including but not limited to batch processes, discrete processes, and/or continuous industrial processes employed in the oil, gas, and/or chemical industries.

In this regard, the various embodiments described herein can be employed in a wide variety of industries and operational facilities. Any industrial process with differing types of operations data may supply data to systems utilizing the invention. For instance, facilities involved with natural resource refinement and procurement, oil and gas procurement, oil and gas refinement, chemical synthesis and refinement, water treatment, power generation, power transmission, food and beverage processing, raw materials processing (e.g. pulp, lumber, metals, and minerals), agricultural processing and materials processing (e.g. steel mills and foundries) may be suited to utilize platforms and software built upon concepts described herein. Additionally, facilities involved in finished goods manufacturing and production such as product assembly lines may utilize one or more embodiments or systems with such features.

These facilities may have various assets, equipment, machinery, flows etc. that produce operations data which may be continuous or discrete and may involve operations data that is presented in batches. Examples include pumps, motors, tanks, pipelines, mills, lathes, mixers, assembly lines, and so on. Operations data may include data from machinery, assets, process historians, maintenance systems, enterprise resource planning systems and the like. Examples of such data include pressure, temperature, capacities, volumes, rates of flow, production totals, inventories, performance indicators and the like.

"Operations data" as used herein includes tag-based point data, non-point data and non-tag-based data. As used herein, point data may be characterized as current, real-time, or value data associated with one or more instruments, components, or portions of a manufacturing, industrial, commercial, or other system. Any of these instruments, components, or portions may be configured to generate, measure, and/or sample point data of interest. For example, a data acquisition system for a particular instrument or machine may continuously or periodically acquire data reflecting a motor's operating speed and/or operating temperature as point data from a point data source associated with the motor. In certain instances, the point data may be a simple numerical or string value. Point data may further be associated with monitoring, control, and reporting functions of various instruments, components, and applications to provide information relating to the operation of a selected system. This information may also be made available for collection and review by various data acquisition and control systems.

Point data is often acquired in a raw or unstructured form wherein the point data reflects a numerical or string value without supporting details, description, and/or attributes. As previously described, certain types of point data may be associated with real-time or near real-time information (e.g. current temperature, pressure, speed, voltage, current, etc.) that may be desirably sampled, updated or refreshed relatively frequently. The exact frequency of these operations is typically dependent on the characteristics of the point data itself and may be different across the multiple point data sources incorporated into a particular system.

A tag may therefore represent a data structure comprising selected quanta of information associated with a particular point data informational source and may also comprise certain non-point data. In conventional systems, acquisition of each tag's current value (e.g. point data-associated information) generally requires a unique configuration for each tag and possibly for each tag's attributes (e.g. non-point data). Considering that it is not uncommon for complex industrial automation applications to contain upwards of 100,000 tags, it will be appreciated that the individualized configuration and management of tags in the aforementioned manner can be very time consuming, inefficient, and error prone. Furthermore, conventional mechanisms for control, monitoring, or archiving of tag-based information tend to become even less useful when attempting to aggregate such information across multiple systems such as in the context of other plant production systems and applications.

Non-point data may take many forms, including but not limited to, attribute information, parameters, limits and other descriptive information. Certain non-point data may be associated with the point data to provide context thereto. As used herein, the terms point data and non-point data encompass various categories of information that are not necessarily constrained to the examples described herein.

Other types of non-point data may include information such as maintenance work orders (relational data or API (Application Programming Interface) structure data from maintenance systems), equipment documentation (unstructured data usually contained within operating system files and documents), and information such as URL (Uniform Resource Locator) links to supplier web sites. These types of non-point data may be associated with non-tag based information contained, for example, within Oracle™ or SAP™ databases/environments. Non-point data therefore represents a broad class of information that may be associated with point data providing a contextual and informational basis.

System 1 includes operational data sources 10 in communication with application environment 20. Also in communication with application environment 20 are administration clients 30 and browsing clients 40.

As used herein, systems "in communication" with one another are directly or indirectly capable of communicating over any number of different systems for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Operational data sources 10 comprise various data sources, including but not limited to plant floor production systems, enterprise resource planning data systems, and other data systems. When employed in an industrial context, data arising from operational data sources 10 may be associated with any aspect of industrial operations, and may consist of point data and non-point data used to characterize, contextualize, or identify the point data and/or the source of the point data. Each data source of operational data sources 10 may comprise one or more disparate hardware and software systems, some of which are not interoperational with one another.

Application environment 20 may issue queries for data to operational data sources 10. In response, operational data sources 10 acquire and transmit the data to application environment 20. Such a transaction may employ any system for querying and responding that is or becomes known. A system utilizing a connector framework is described below.

Application environment 20 may comprise enterprise server 22, Web server 24, and solution server 26. Application environment 20 may comprise a single server device or multiple devices. In various embodiments, enterprise server 22, and solution server 26 comprise application programs developed in Java and/or C++ and running under Windows XP/NT/2000/2003.

Web server 24 manages data communication between application environment 20, administration clients 30, and browsing clients 40. One or both of administration clients 30 and browsing clients 40 may execute one or more Java applets to interact with Java servlets of Web server 24 according to some embodiments.

Solution server 26 is used to access data from operational data sources 10. In some embodiments, solution server 26 includes connection groups and connection processes. A connection group includes one or more object instances, each of which is associated with a particular data source of operational data sources 10. Different connection groups are associated with different data sources. A connection process comprises processor-executable process steps to retrieve data from a particular type of data source (e.g. an Oracle™ database). A connection process may comply with standard or proprietary protocols, including but not limited to ODBC, JDBC, OPC DA, OPC HDA, OPC AE, and Web Services.

Several different connection groups may use a same connection process to access their respective data sources. Moreover, each object instance includes scripts (e.g. Structured Query Language scripts) to populate itself based on retrieved data. Solution server 26 manages the objects, connection groups and connection processes to access data that is acquired and stored by disparate systems of operational data sources 10.

Solution server 26 may transmit the data acquired from operational data sources 10 to data store 50 for storage according to some embodiments. Data store 50 may store any data used during the operation of application environment 20. Data may be stored in data store 50 according to any currently- or hereafter-known protocol for storing data. Data store 50 may also comprise a front-end application that is usable to access and/or manage the data stored therein. According to some embodiments, data store 50 may receive data directly from operational data sources 10.

Administration clients 30 may provide user interfaces to perform administration activities with respect to system 1. For example, administration clients 30 may allow an administrator to create or modify an object of a connection group and its associated connection process. Information received by the user interfaces may be transmitted to data store 50 via Web server 24. Examples of administration clients 30 according to some embodiments include, but are not limited to, a desktop computer, a laptop computer, a computer terminal, a personal digital assistant, a telephone, and a tablet computer.

Browsing clients 40 may be used to present views of data contained in data store 50. Such views may include real or near-real time data and may include data stored in data store in an object-oriented format. Browsing clients 40 may provide any client application such as a Web browser or a Java applet. As such, a browsing client 40 may be connected to application environment 20 through the Internet or through an Intranet. Browsing clients 40 may be executed by any suitable user device, including but not limited to those mentioned above with respect to administration clients 30.

Model database 60 receives component definitions from enterprise server 22. The component definitions may comprise all or a portion of a component model. Such a component model may represent tag-based data (including point data and non-point data) and non-tag-based data that are generated by a continuous industrial process. In some embodiments, the tag-based data may be generated by and received from SCADA, HMI, DCS, plant historians, etc., and the non-tag-based data may be generated by and received from business systems and applications (e.g., SAP (ERP), Oracle Manufacturing Apps, general database apps, etc). Moreover, the component model may represent assets and geographies of a plant or manufacturing organization.

Commonly-assigned U.S. Pat. No. 6,700,590 describes a system to use a class-based object and view model to collect and display data received from multiple heterogeneous sources. This system encapsulates received tag-based data and non-tag-based data as objects, which are instantiations of defined components. The use of components and objects may provide reusability, consistency, inheritance and other benefits known to those familiar with object-oriented techniques. The component model may be established and utilized in any manner, including but not limited to those specified in aforementioned U.S. Pat. No. 6,700,590 and/or U.S. patent application Publication No. 2005/0144154, the contents of which are herein incorporated by reference for all purposes. The component model may follow any suitable modeling protocol or format; including those mentioned in the foregoing references.

Database 60 also receives definitions of objects and/or object collections from solution server 26. Each object and/or object collection is an instantiation of a component defined in the component model. For example, as will be described in more detail below, a component may represent a generic pump, with members of the component representing data related to the pump, such as name, location, speed, temperature, etc. An object (or object collection) that is instantiated based on this component may represent a specific physical pump (or several specific physical pumps).

According to some embodiments, a database management system associated with database 60 determines a plurality of relational database tables based on the received component definitions and object definitions. Details of this determination according to some embodiments will be described below. The relational database tables may reflect some or all of the associations and relationships between data, components and objects within the received definitions. Database 60 may comprise one or more devices and is not limited to a device that exclusively or primarily provides database functionality.

Database 60 transmits the tables, or model definition, to schema generation module 70. Schema generation module 70 determines a logical model and a physical model based on the model definition and on information received from data mart wizard 80. In some embodiments, module 70 receives a selection of an object as a dimension of the logical model. The selection may be received from wizard 80, from which module 70 also receives a first indication of a first plurality of members of the selected object to be associated with dimension data, or attributes, of the logical model. Module 70 also receives a second indication of a second plurality of members of the selected object to be associated with fact data, or attributes of the logical model.

Schema generation module 70 may create a dimension table associated with the selected object and including columns corresponding to the first plurality of members. Module 70 may also create a fact table including a foreign key column corresponding to the dimension table and including a column corresponding to each of the second plurality of members. Details of the foregoing according to some embodiments will be described below.

Schema generation module 70 may be embodied by any combination of hardware and/or software. According to some embodiments, schema generation module 70 comprises processor-executable process steps executed by a device including model database 60, data store 50, and application environment 20.

Data mart wizard 80 comprises any suitable system for receiving user input. Wizard 80 may comprise a Java applet executed by a device that also executes an administration client 30 and/or a browsing client 40. Wizard 80 may present user interfaces to a user, receive user selections and indications based on user manipulation of the presented interfaces, and transmit the selections and indications to schema generation module 70.

Schema generation module 70 creates data mart 90 based on the fact and dimension tables. Schema generation module 70 may also create functions, sequence generators, constraints, and/or scripts for populating the tables. These functions, sequence generators, constraints, and/or scripts may be executable by a database management system associated with data mart 90 to populate the tables.

The database management system associated with data mart 90 may also be compatible with analytic/DSS tools 100. Tools 100 may allow a user to review time-series or historical data stored within data mart 90. Such data may include data received by solution server 26 from operational data sources 10 and stored in an object-oriented format in data store 50. Reports 110 may also be produced based on the data stored in data mart 90. Efficiency and customizability of such reporting are known benefits of data marts.

The elements of FIG. 1 may be configured differently than as shown, and each block shown may be implemented by one or more hardware and software elements. The hardware and software elements of one or more blocks may be located remotely from each other. Some embodiments may include less or more elements than those shown.

Figure 2:
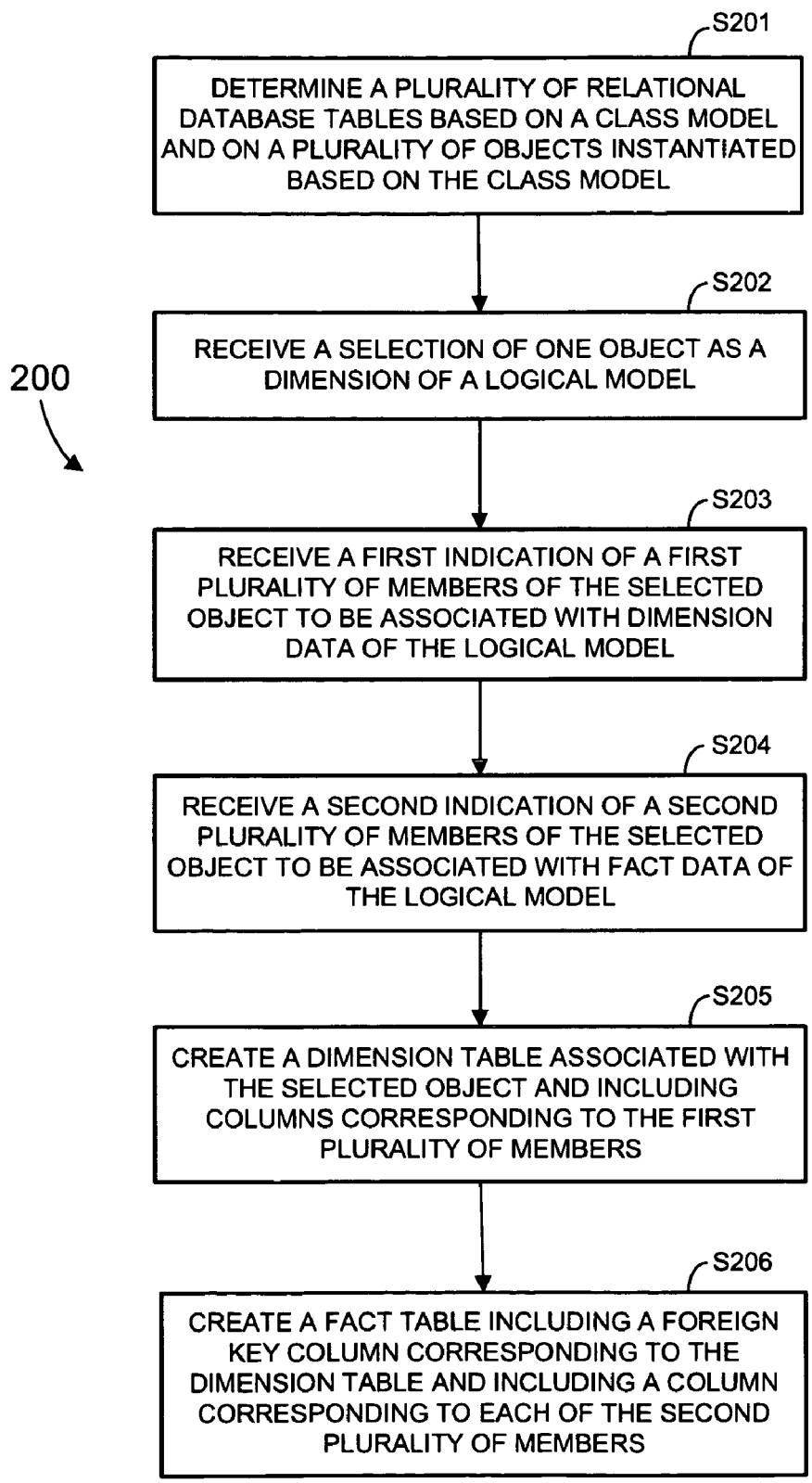
FIG. 2 is a flow diagram of process steps according to some embodiments.

FIG. 2 illustrates process steps 200 according to some embodiments. Process steps 200 are described below as if embodied in model database 60 and schema generation module 70. However, process steps 200 may be embodied in one or more software or hardware elements and executed, in whole or in part, by any device or by any number of devices in combination, including but not limited to those devices illustrated in FIG. 1. Moreover, some or all of process steps 200 may be performed manually.

Process steps 200 may be embodied in processor-executable process steps read from one or more of a computer-readable medium, such as a floppy disk, a CD-ROM, a DVD-ROM, a Zip™ disk, a magnetic tape, or a signal encoding the process steps, and then stored in a compressed, uncompiled and/or encrypted format. In alternative embodiments, hard-wired circuitry may be used in place of, or in combination with, processor-executable process steps for implementation of processes according to some embodiments. Thus, embodiments are not limited to any specific combination of hardware and software.

Initially, a plurality of relational database tables is determined at step S201. The tables are determined based on a class (component) model and on a plurality of objects that are instantiated based on the class model. In one example of step S201, model database 60 receives component definitions from enterprise server 22. Database 60 also receives definitions of objects and/or object collections from solution servers 26. The class model and objects may comply with an industrial operations intelligence platform or any suitable object-oriented specification that is or becomes known.

A database management system associated with database 60 then determines a plurality of relational database tables based on the received component definitions and object definitions. The relational database tables may reflect some or all of the associations and relationships between data, components and objects that are reflected in the received definitions. The tables are then transmitted to schema generation module 70.

Schema generation module 70 receives a selection of an object as a dimension of the logical model at step S202. The selection may be a selection of a user interfacing with data mart wizard 80. For example, data mart wizard 80 may present a list of objects based on the received database tables. A user may select one of the objects as a logical model dimension, and the selection may be forwarded to module 70. Variations of step S202 according to some embodiments are presented below with respect to step S304 of process steps 300.

Module 70 then receives, at step S203, a first indication of a first plurality of members of the selected object to be associated with dimension data of the logical model. Continuing with the current example, data mart wizard 80 may present an interface including a list of members of the selected object. The user may manipulate the interface to indicate that several of the members are to be considered attributes of the logical model dimension that is represented by the selected object. The user may also manipulate the interface to indicate that several other of the members are to be associated with fact data of the logical model. The second indication is received at step S204.

At step S205, schema generation module 70 creates a dimension table that is associated with the selected object and that includes columns corresponding to the first plurality of members. Module 70 also creates a fact table at step S206. The fact table includes a foreign key column corresponding to the dimension table and a column corresponding to each of the second plurality of members. The fact table and the dimension table are elements of a physical model that may be transmitted to a data mart for population. Accordingly, some embodiments provide the benefits of data mart/warehouse storage to data that was obtained according to a class-based model of an operations intelligence platform.

Figure 3A:
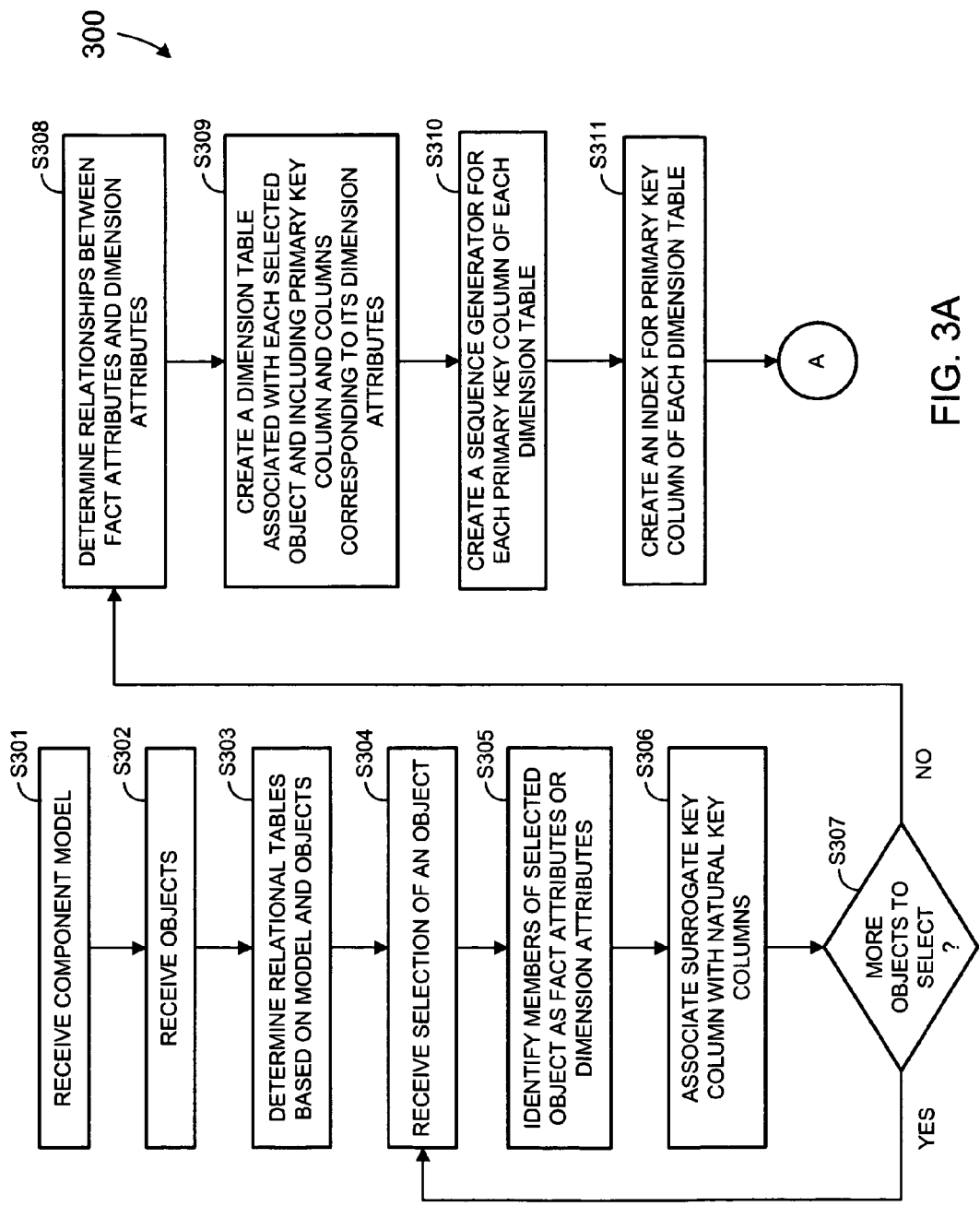
FIGS. 3A and 3B include a flow diagram of process steps according to some embodiments.
Figure 3B:
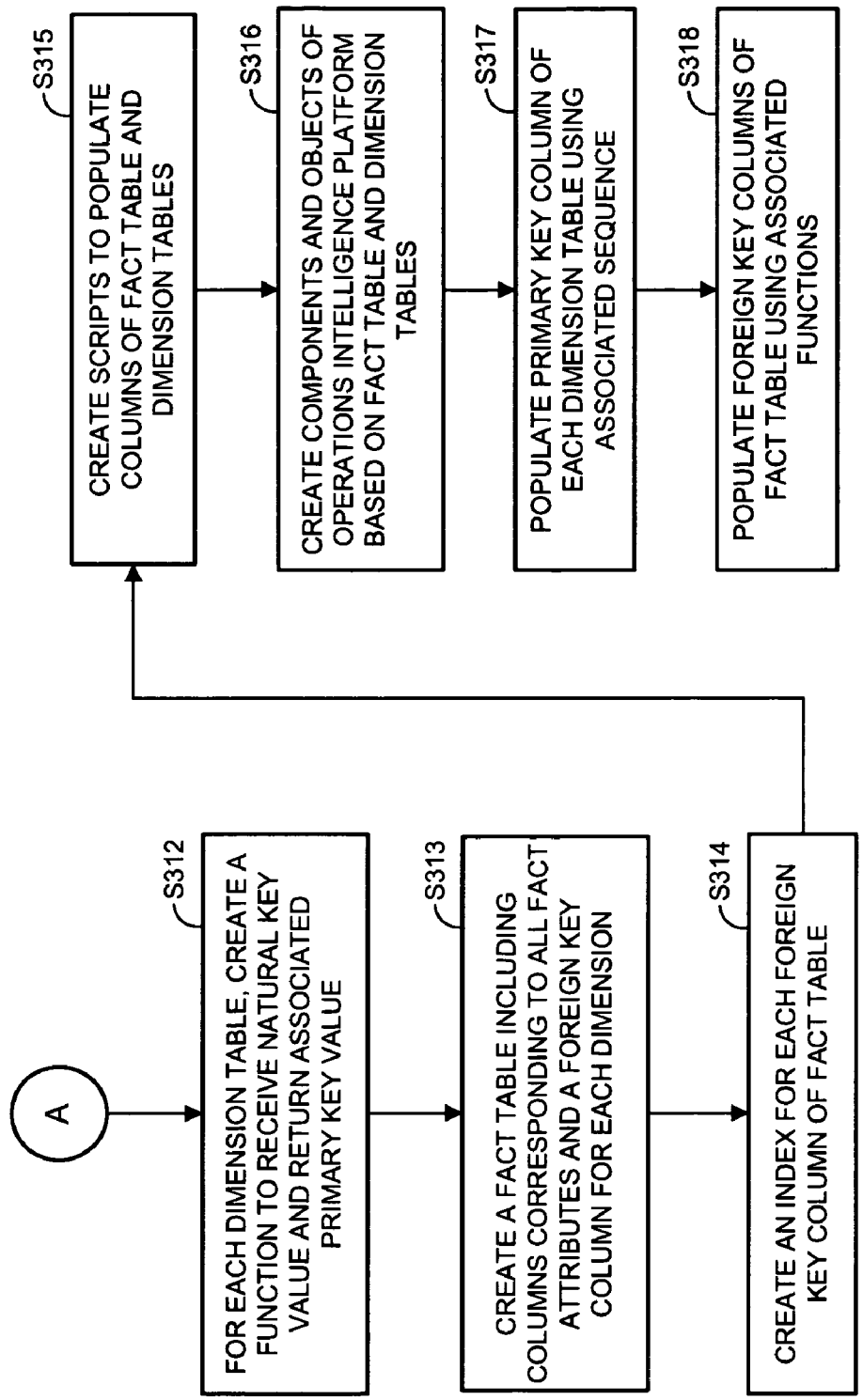

To provide a more detailed example of operation according to some embodiments, FIGS. 3A and 3B illustrate process steps 300. Process steps 300 may be embodied in any manner, including those described above with respect to process steps 200. Although they will be described linearly, process steps 200 may be performed recursively according to some embodiments. Process steps 300 will be described below as if embodied in model database 60 and schema generation module 70.

A component model is initially received at step S301. The component model may consist of component definitions received from enterprise server 22. Objects corresponding to the component model are received at step S302. The objects may be received from solution servers 26 and may comprise object/object collection definitions that are instantiated based on the received component model. As mentioned above, the component model and object definitions may comply with any suitable object-oriented specification that is or becomes known. In some embodiments, the component model is associated with an industrial operations intelligence platform. Steps S301 and S302 may occur simultaneously or in any order according to some embodiments.

Figure 4:
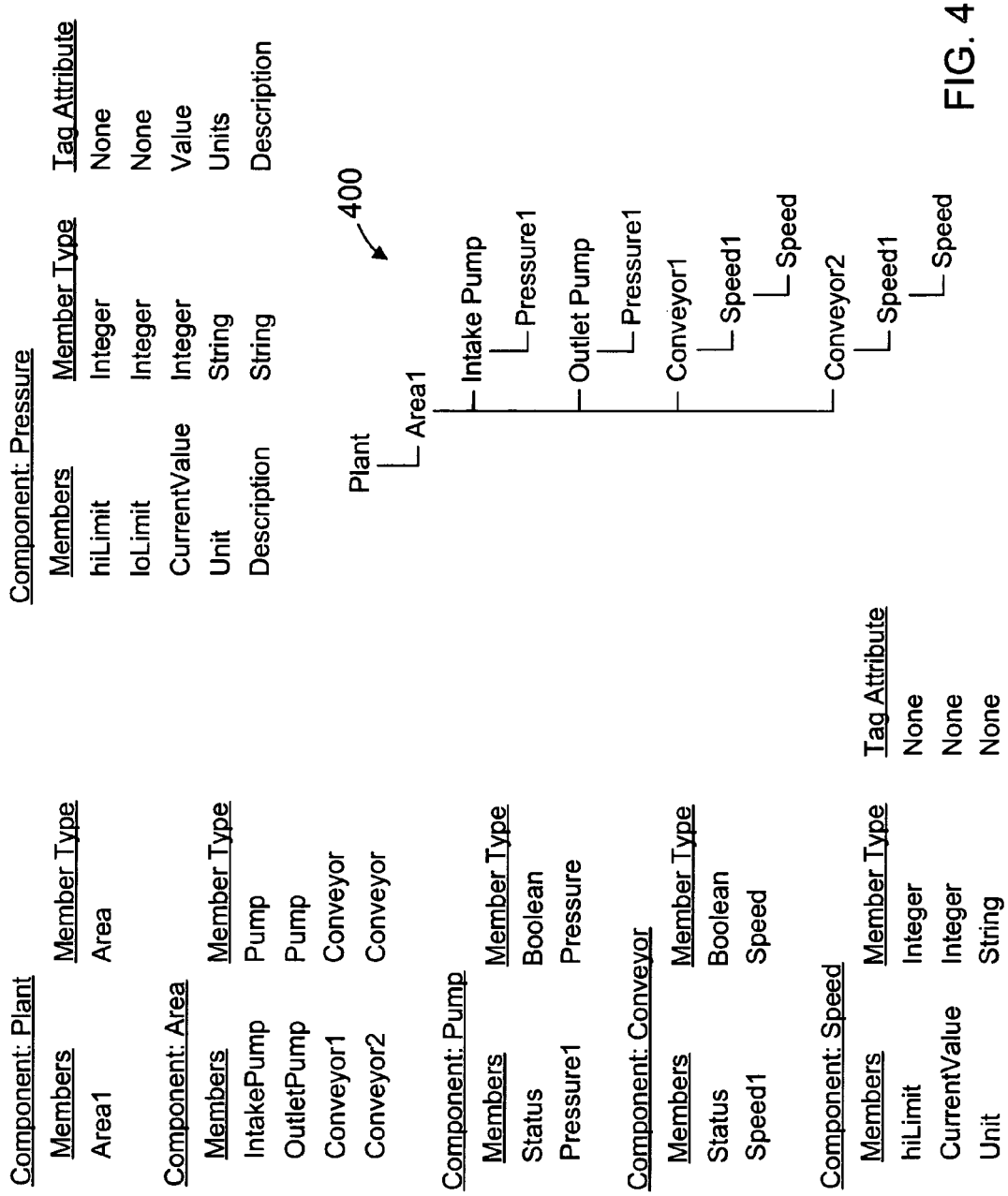
FIG. 4 illustrates a component model according to some embodiments.

FIG. 4 illustrates component model 400 that may be received at step S301 according to some embodiments. Each component includes at least one member, and each component member is associated with a member type. A member of a first component may be a second component, in which case the associated member type is the name of the second component. All members that are associated with "primitive" member types (which include anything other than another component) are either associated with a tag attribute or not (i.e. "None").

Component model 400 of FIG. 4 is shown in a tree or hierarchical format which facilitates visualization and understanding of the relationships and patterns of inheritance/instantiations for the various component definitions of FIG. 4. Component model 400 may therefore be displayed to an administrator or user according to some embodiments. In the illustrated embodiment, only components whose members are not associated with tag attributes are displayed in component model 400.

Figure 5:
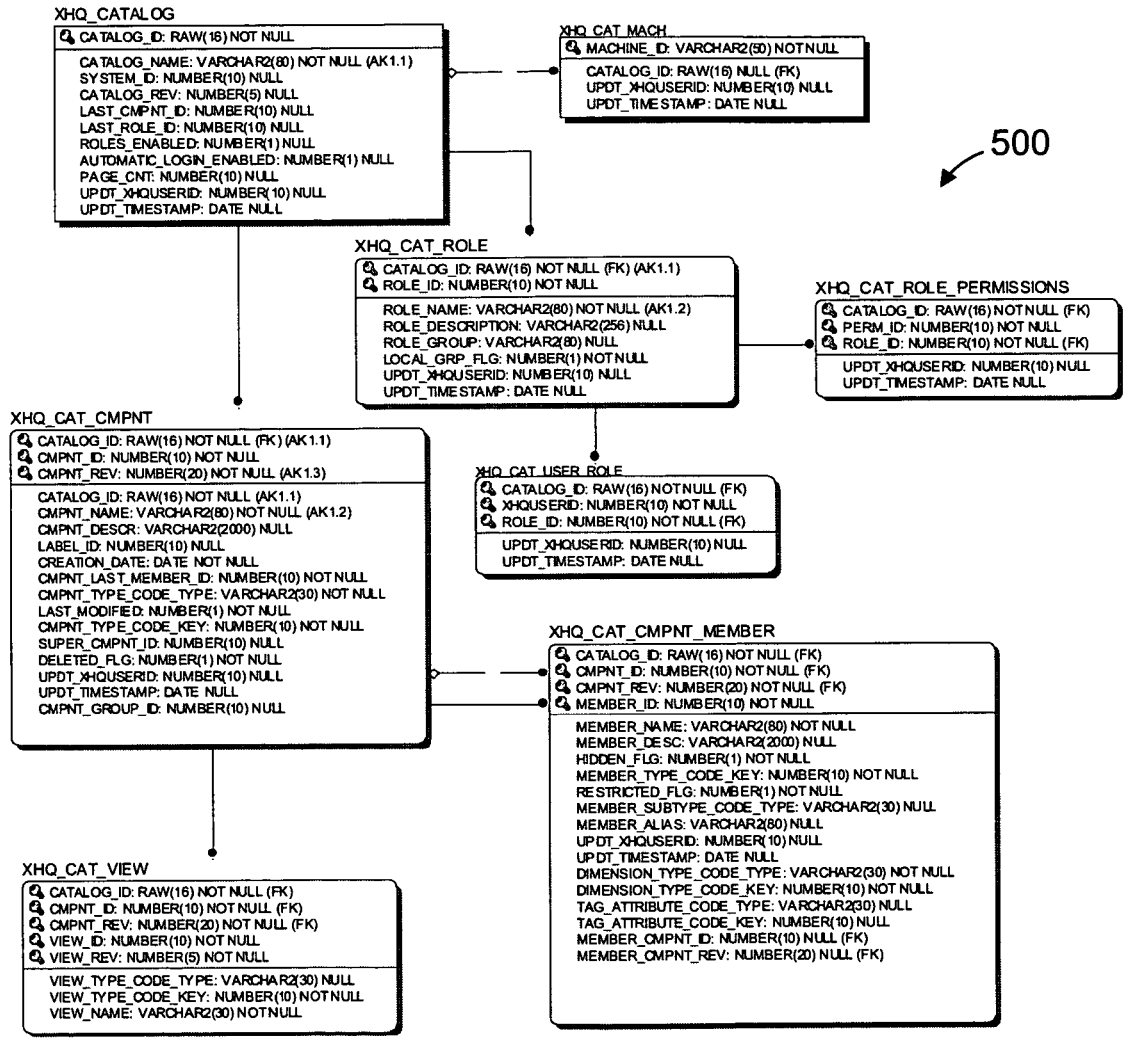
FIG. 5 is a relational view of relational database tables determined based on a component model according to some embodiments.

A plurality of relational database tables is then determined at step S303 based on the component model and on the object definitions. The determination at step S303 is based on the relationships between components, objects, and object members that are specified by the component model and object definitions. FIG. 5 illustrates relationship diagram 500 of eight database tables that are determined based on a component model according to an example of step S303. Each table includes a single or multi-part primary key (denoted by key icons) and columns for data related to the subject of the table. The solid lines between tables indicate an identifying relationship, while the dashed lines indicate a non-identifying relationship.

Figure 6:
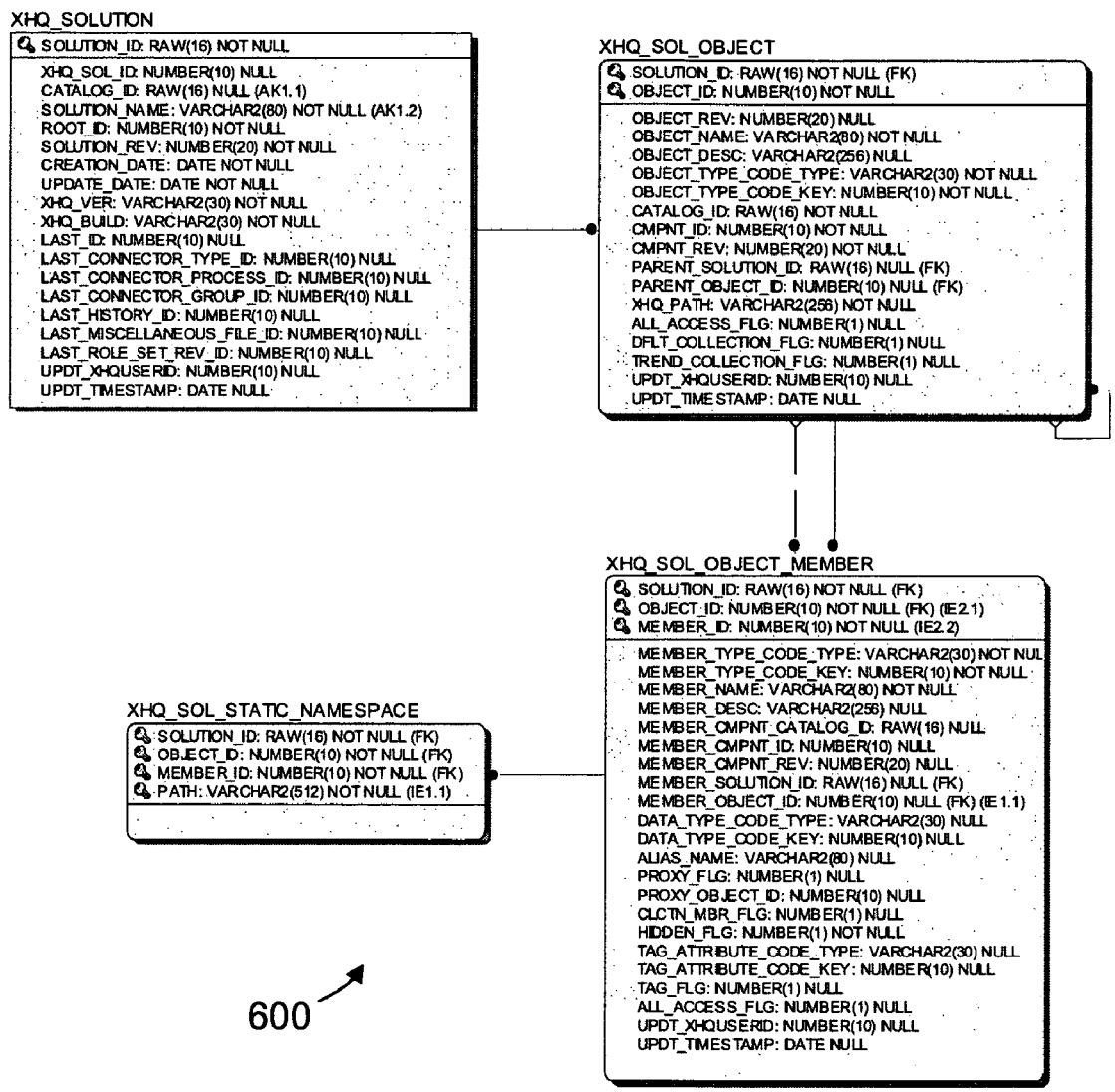
FIG. 6 is a relational view of relational database tables determined based on instantiations of objects of a component model according to some embodiments.

FIG. 6 illustrates relationship diagram 600 of four database tables that are determined at step S303 based on object definitions received from solution servers 26. Again, each table includes a primary key and data columns and is related to one or more other tables as indicated by the solid and dashed lines. A column of any table of diagram 600 may correspond to a column of a table shown in diagram 500. Data model 60 may transmit the tables determined at step S303 to schema generation module 70.

A selection of an object is received at step S304. The selection indicates that the object is to be a dimension of a logical model. According to some embodiments, the selection is received by schema generation module 70 from data mart wizard 80. More particularly, data mart wizard 80 may execute a client application to access a corresponding server application executed by schema generation module 70. The client application may comprise a Web browser, Java applet, or any other type of client application. Accordingly, the server application executed by module 70 may comprise a Web server or other suitable server application.

Figure 7:
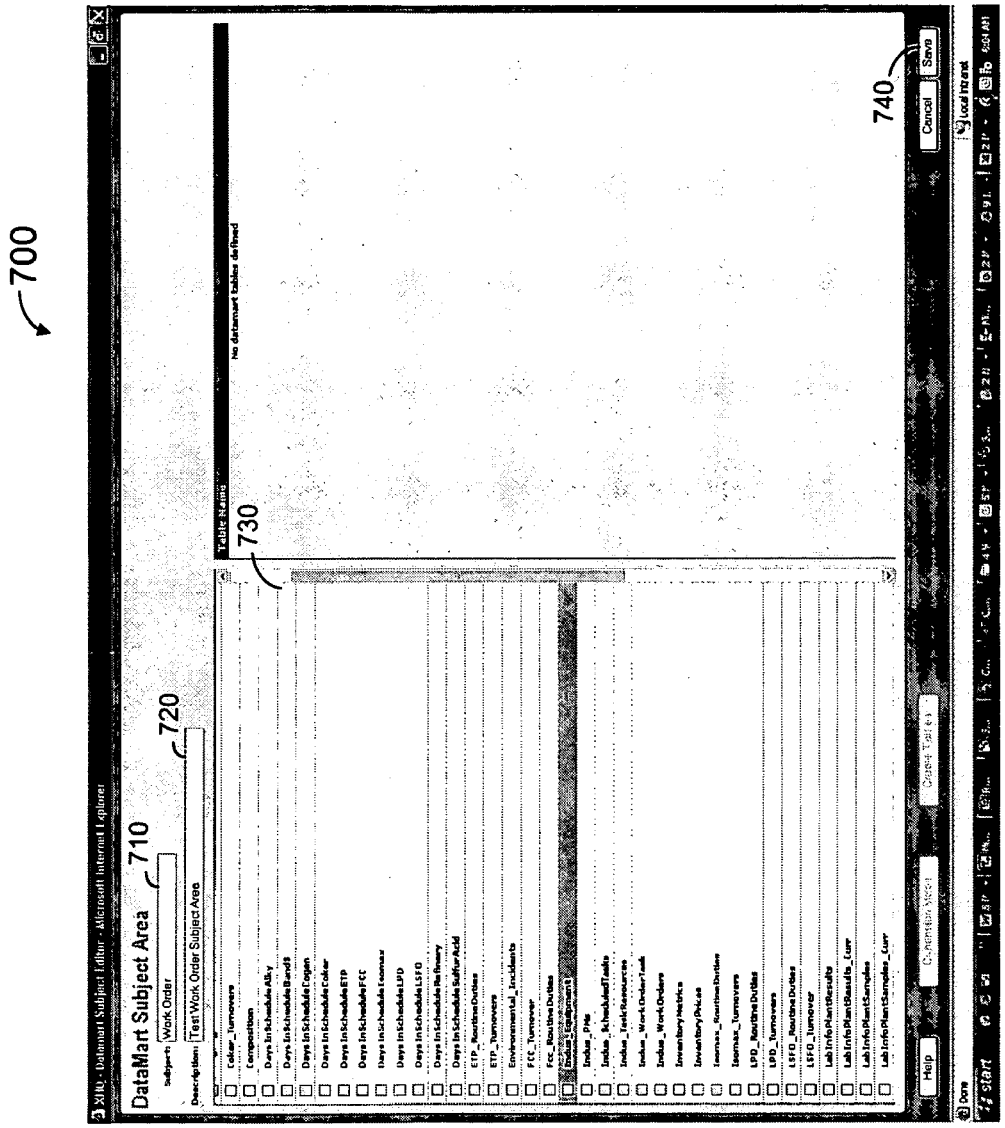
FIG. 7 is an outward view of an interface to receive object selections according to some embodiments.

The client application may request access to a data mart configuration utility using any suitable protocol. Module 70 may perform any required authentication and/or security checks before transmitting a user interface (e.g., a Web page) to data mart wizard 80. FIG. 7 illustrates such a user interface according to some embodiments. Embodiments are not limited to the function, appearance or arrangement of the user interfaces described herein.

User interface 700 of FIG. 7 may be presented by a display element of a device that executes data mart wizard 80. Interface 700 may comprise some elements provided by the aforementioned client application and other elements provided by schema generation module 70. As shown, interface 700 includes Subject field 710 and Description field 720. A user may populate these fields using an input element of the device executing data mart wizard 80. Subject field 710 indicates the subject of the data mart to be created and Description field 720 provides an additional description of the data mart.

Area 730 displays a list of objects that are represented in the relational tables that were determined at step S303. Area 730 includes checkboxes for selecting one of the objects. According to the illustrated embodiment, the user selects a checkbox adjacent to an object and then selects Save icon 740. As a result, schema generation module 70 receives a selection of the object at step S304.

Figure 8:
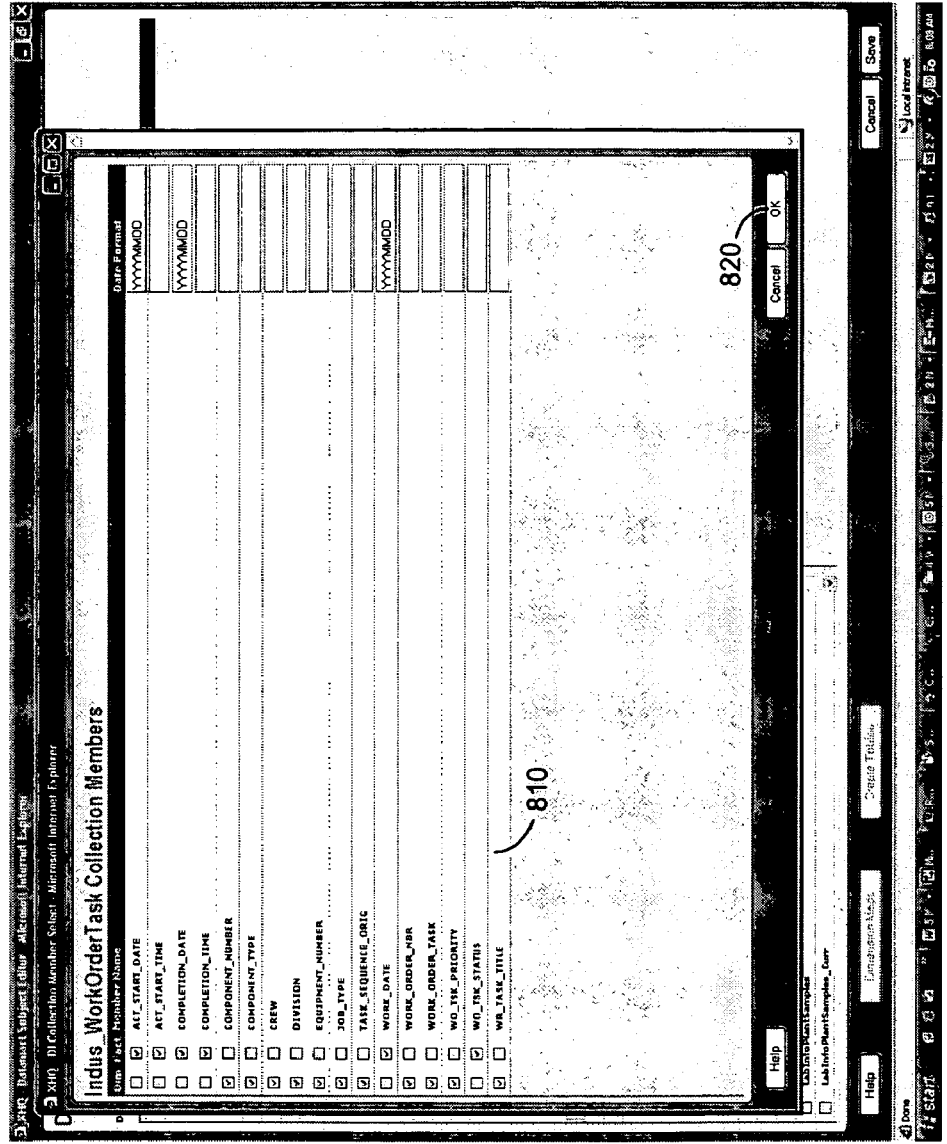
FIG. 8 is an outward view of an interface to receive indications of object members to be associated with dimension data or fact data according to some embodiments.

Next, at step S305, module 70 identifies members of the selected object as fact attributes or dimension attributes. Dimension attributes will be associated with dimension data of the logical model, and fact attributes are to be associated with fact data of the logical model. Continuing with the current example, data mart wizard 80 may present interface 800 of FIG. 8 at step S305. Interface 800 includes area 810, which presents the primitive members of the object selected at step S304. The primitive members may be determined based on the relational database table(s) that corresponds to the selected object.

Area 810 includes two checkboxes adjacent to each displayed member. The user may use the checkboxes to indicate whether a member is to be a dimension attribute (i.e., associated with dimension data) or a fact attribute (i.e., associated with fact data). Some embodiments also allow the user to change a data type of a member from the data type that is specified in the selected object. The indications are transmitted to module 70 upon user selection of OK icon 820.

In some embodiments of step S305, no indication is received with respect to one or more displayed members. These one or more members are therefore not associated with dimension data or fact data in the logical model. A user may identify some members of the selected object as fact attributes and none of the members as dimension attributes and/or some members of the selected object as dimension attributes and none of the members as fact attributes according to some embodiments.

Moreover, some embodiments allow the user to select more than one object in step S304. The selected objects are used to define a single dimension, which may be named according to the first selected object or by another convention. Primitive members of both dimensions may be displayed in interface 800 according to these embodiments.

According to some embodiments of step S304, the user may select a displayed object as a dimension and issue an instruction to present a list of objects based on the selected object. The objects of the list may be determined based on the selected object and on the relationships defined in the relational tables determined at step S303. The user may then select one or more of the listed objects and identify members of the selected object(s) as fact attributes or dimension attributes as described above.

Schema generation module 70 associates a surrogate key column with natural key columns of the dimension at step S306. The natural key columns of the dimension are associated with a set of members that provide uniqueness to the data therein. In the case of a Work_Order dimension, the natural key columns may be associated with Work_Order_ID and Work_Order_Date members. If the selected object is a collection object, the columns defined in the collection as keys may be suggested by module 70 to be the natural key columns. If the dimension consists of more than one collection object, the union of such columns may be suggested to be the natural key columns. The user may be prompted to verify the validity of any automatically suggested or manually input natural keys.

It is then determined at step S307 whether more objects are to be selected as dimensions of the logical model. If so, flow returns to step S304 and continues as described above to define another dimension of the logical model including dimension attributes and/or to define fact attributes of a fact table of the logical model.

Some embodiments allow a user to select objects at step S304 that are not represented in the objects received at step S302. For example, an interface such as interface 700 may present a Shift object and a Date object that may be selected as dimensions of the logical model. Accordingly, members of these objects may be identified as fact attributes, dimension attributes, or neither at step S305. Members of the Shift object may include Shift_Name, Interval_ID, Start_Time_Seconds, End_Time_Seconds, etc. Some embodiments include the Date dimension in the logical model regardless of whether the user selects the Date object.

Figure 9:
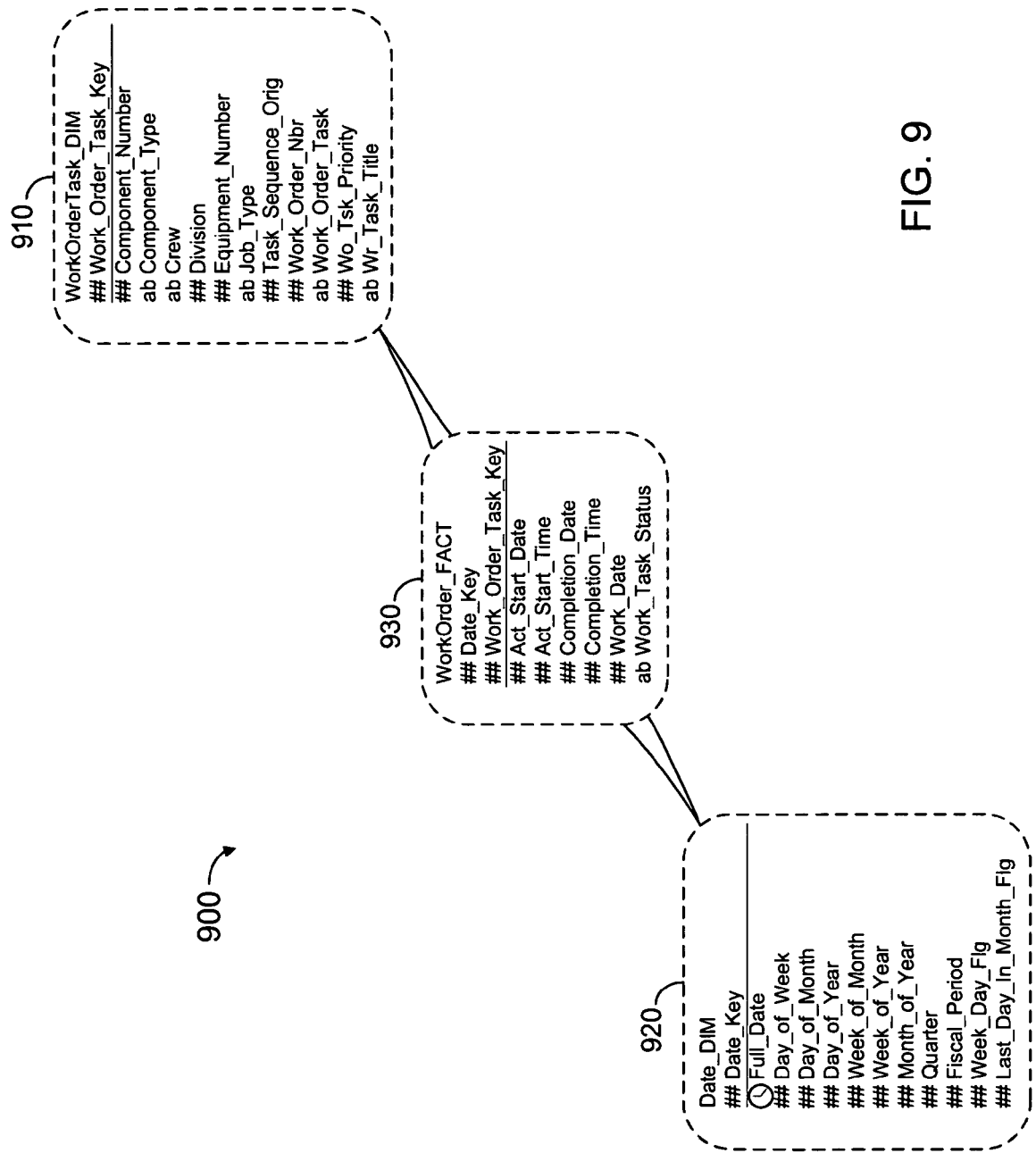
FIG. 9 is a logical model of relational database tables according to some embodiments.

FIG. 9 is a representation of logical model 900 according to some embodiments. Logical model 900 represents user selection of the Work_Order_Task object at step S304 and selection of the aforementioned Date object during a second pass through step S304. Accordingly, dimension 910 is related to the Work_Order_Task object and dimension 920 is related to the Date object.

Dimension 910 illustrates the members of the Work_Order_Task object that were identified as dimension attributes at step S305. Fact data 930, on the other hand, illustrates the members of the Work_Order_Task object that were identified as fact attributes at step S305. Dimension 920 shows members of the Date object that were indicated to be associated with dimension data. In the illustrated example, none of the members of the Date object were indicated to be associated with fact data.

Dimension 910 and dimension 920 include primary keys Work_Order_Task_Key and Date_Key, respectively. Fact data 930 includes a multipart primary key that is composed of Work_Order_Task_Key and Date_Key. Flow proceeds from step S307 to step S308 if no further objects are to be selected for the logical model.

Relationships between fact attributes and dimension attributes are determined at step S308. More particularly, relationships between objects supplying the fact data and collections supplying the dimension data are mapped in step S308. These mappings may be determined by querying the relational database tables determined at step S303.

In some embodiments of step S308, module 70 determines an object that has a defined relationship to all other objects represented in the logical model. If no such object can be determined, module 70 determines an object having the most defined relationships with the other objects of the logical model. According to some embodiments, module 70 may attempt to determine the object by inferring relationships based on column names and associated data types that are common between two or more objects. The determined object may be suggested to the user as the primary data source for the fact data.

Figure 10:
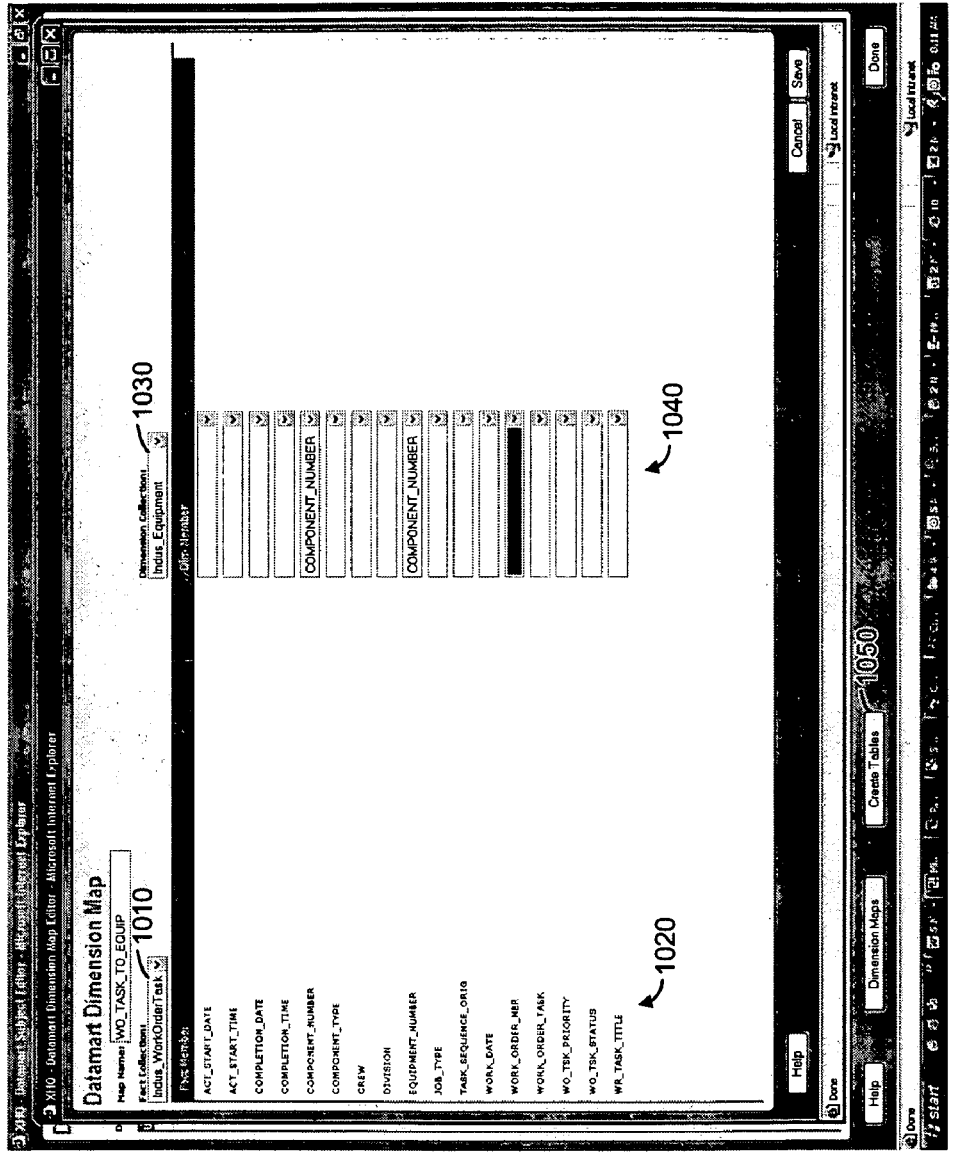
FIG. 10 is an outward view of an interface to receive associations between fact attributes and dimension attributes according to some embodiments.

FIG. 10 illustrates interface 1000 for manually specifying the foregoing relationships. Interface 1000 may be presented by the device that executes data mart wizard 80. A user of the device may therefore manipulate interface 1000 to transmit the above-mentioned relationships to schema generation module 70. Interface includes pull-down field 1010 to specify an object that includes 25 members that have been identified as fact attributes. All members of the specified object are presented in area 1020.

Pull-down field 1030 allows the user to specify an object that includes members that have been identified as dimension attributes. Moreover, pull-down fields of area 1020 allow the user to select members of the object specified in field 1030. After all mappings are complete, the user may then select Create Tables icon 1050 to transmit the mappings to schema generation module 70.

Next, at step S309, schema generation module 70 creates a dimension table that is associated with each selected object. The dimension table includes a primary key column and columns corresponding to each dimension attribute of the dimension. FIG. 11 is a representation of Work_Order_Task dimension table 1100 that corresponds to logical model 900 according to some embodiments. As shown, table 1100 includes a primary key column and columns corresponding to six of the dimension attributes shown in dimension 910 of logical model 900. Although they are included in table 1100 according to some embodiments, columns corresponding to the remaining five dimension attributes have been omitted due to space constraints.

FIG. 12 is a representation of Date dimension table 1200 that is also created at step S309 according to some embodiments. Table 1200 also includes a primary key column and columns corresponding to six of the dimension attributes shown in dimension 920 of logical model 900. Columns of table 1200 that correspond to the remaining five dimension attributes have been omitted from FIG. 12 due to space constraints.

A sequence generator is created for each primary key column of each created dimension table at S310. The sequence generator is an executable function that allows data mart 90 to populate the primary key columns of the created tables with keys. Some embodiments also create a constraint for the primary key column of each dimension table to ensure that a dimension table does not include any duplicate primary keys. Additionally or alternatively, some embodiments create a constraint for the identified natural key columns of each dimension table to ensure that a dimension table does not include two or more records with identical natural keys.

Next, at step S311, schema generation module 70 creates an index for the primary key column of each dimension table. The index may sort the primary key values of the primary key column according to any particular order, and may associate each thusly-sorted primary key value with a pointer to the dimension table row that includes that primary key value. The index may therefore be used to quickly locate a row (record) of the dimension table.

A function is created for each dimension table at step S312. The function takes a natural key value as input and outputs a primary key value that is associated with the natural key. Such a function may enable loading of a fact table with values of fact attributes that are associated with the natural key value.

The fact table is created at step S313. The fact table includes columns corresponding to all fact attributes defined in the logical model. The fact table also includes a foreign key column corresponding to each dimension of the logical model. FIG. 13 shows fact table 1300 that is created based on logical model 900 according to some embodiments. Fact table 1300 includes foreign key columns corresponding to dimensions 910 and 920 and other columns corresponding to each fact attribute of fact data 930. The foreign key columns are to include values that map to primary key values of the corresponding dimension tables.

Schema generation module 70 creates an index for each foreign key column of the fact table at step S314. As described above, the index may sort the foreign key values of a foreign key column according to any particular order, and may associate each sorted foreign key value with a pointer to the fact table row that includes that foreign key value. The indexes may therefore be used to quickly locate a row (record) of the fact table based on any foreign key value.

Scripts to populate the columns of the fact table and the dimension tables are created at step S315. The scripts may comprise Structured Query Language (SQL) scripts to extract data from data store 50. The scripts may be created based on the object members associated with each dimension attribute and fact attribute. Module 70 may create data mart 90 based on the fact and dimension tables, and may provide the indexes, constraints, functions and sequence generators to a database management system associated with data mart 90.

Figure 14:
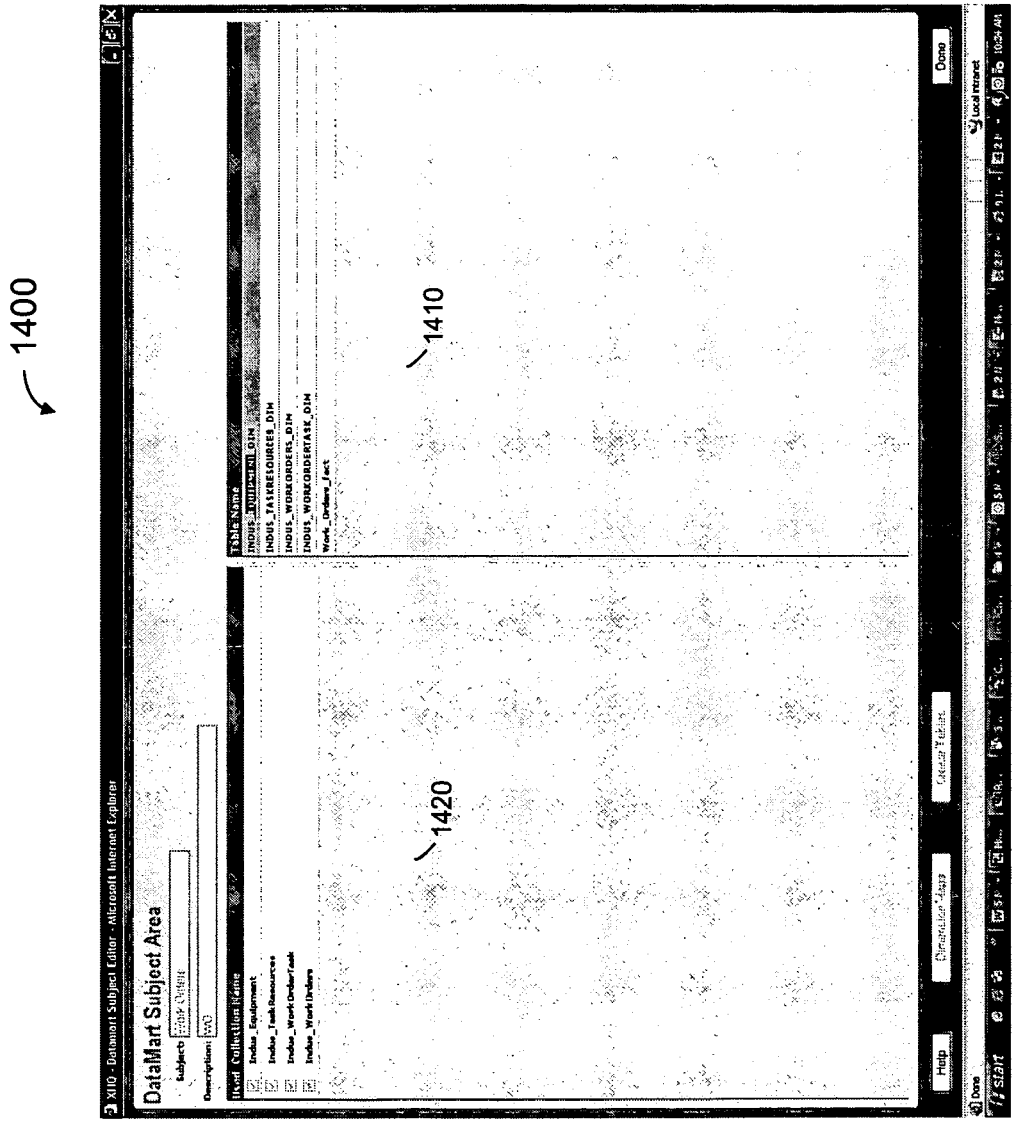
FIG. 14 is an outward view of an interface to present a list of created relational tables according to some embodiments.
Figure 15:
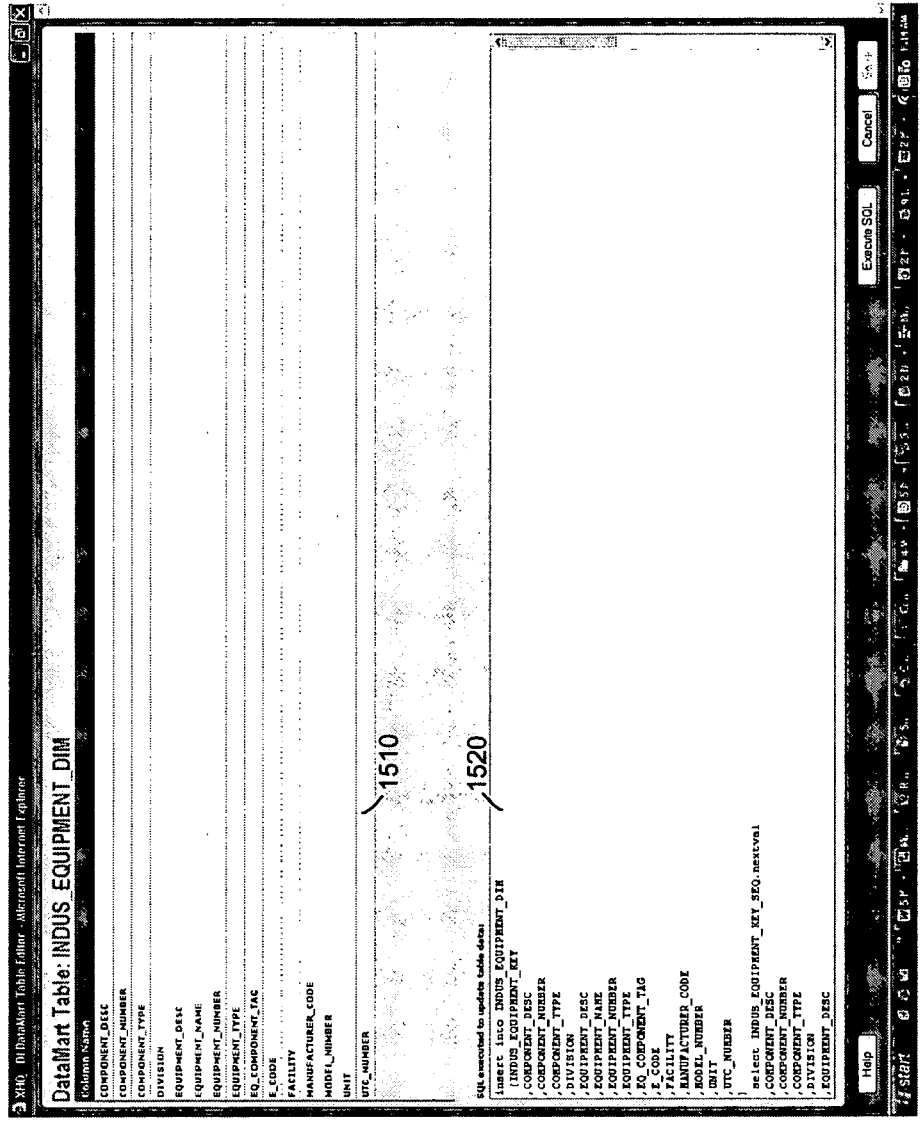
FIG. 15 is an outward view of an interface to view columns of a created relational table and a script to update the columns according to some embodiments.

FIG. 14 includes interface 1400 that may be displayed to a user after step S315. Area 1410 of interface 1400 presents a list of the created tables, and area 1420 lists the objects used to populate columns of the tables. FIG. 15 shows interface 1500 that may be presented upon selection of one of the tables listed in area 1410.

Area 1510 of interface 1500 displays the columns of the selected table. Area 1520 displays the scripts generated at step S315 to update the columns of the selected table. Any suitable scripting language that is or becomes known may be used in conjunction with some embodiments.

At step S316 of process steps 300, components and objects may be created based on the fact table and the dimension tables. According to some embodiments, a data dictionary stores information describing the structure and interrelationships of the tables. The information is used to define the components and objects. The components and objects may comply with the operations intelligence platform described with respect to step S301. As such, the data of the fact table and dimension tables may be viewed and monitored as otherwise provided for by the operations intelligence platform.

The primary key columns of the dimension tables are populated at step S317. A primary key column of a dimension table may be populated by executing the sequence created at step S310 for the dimension table. Foreign key columns of the fact table are populated at step S318 using the functions created at step S312.

As an example of step S318 according to some embodiments, a single object may include values corresponding to fact attributes and values corresponding to dimension attributes. When the object is updated by system 1, a record of a dimension table corresponding to the object is populated with the dimension attribute values. The function created for the dimension at step S312 receives the natural key of the record and outputs the primary key of the record. The primary key is placed in a record of the fact table within a foreign key column that corresponds to the dimension table, and the fact attribute values of the object are placed in corresponding columns of the record.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
determining a plurality of relational database tables based on a class model representing tag-based data and non-tag-based data and on a plurality of objects instantiated based on the class model;
after determining the plurality of relational database tables, receiving a selection of one object of the objects as a dimension of a logical model;
receiving a first indication of a first plurality of members of the selected object to be associated with dimension data of the logical model;
receiving a second indication of a second plurality of members of the selected object to be associated with fact data of the logical model;
creating, with a device, at least one dimension table after receiving the selection of the selected object, the at least one dimension table associated with the selected object and including a primary key column and columns corresponding to the first plurality of members;
creating a fact table after receiving the selection of the selected object, the fact table including a foreign key column corresponding to each of the at least one dimension table, such that a plurality of dimension tables would result in a corresponding plurality of foreign key columns in the fact table, the fact table additionally including a column corresponding to each of the second plurality of members; and
a primary key of the at least one dimension table being placed in a record of the fact table within the foreign key column corresponding to the at least one dimension table.

2. The method according to claim 1, further comprising:
receiving a second selection of a second object of the objects as a second dimension of a logical model;
receiving a third indication of a first plurality of members of the second object to be associated with dimension data of the logical model;
receiving a fourth indication of a second plurality of members of the second object to be associated with fact data of the logical model; and
creating a second dimension table associated with the second object and including columns corresponding to the first plurality of members of the second object,
wherein the fact table includes a second foreign key column corresponding to the second dimension table and a column corresponding to each of the second plurality of members of the second object.

3. The method according to claim 2, further comprising:
determining a mapping between at least one members of the selected object and at least one member of the second object.

4. The method according to claim 2, further comprising:
determining a list of objects based on the selected object and the plurality of relational database tables,
wherein the second object is selected from the list.

5. The method according to claim 1, wherein the dimension table includes a primary key column, and further comprising:
creating a function to receive values of one or more columns of the dimension table and to output a value of the primary key column of the dimension table, wherein the value identifies a row of the dimension table including the received values.

6. The method according to claim 1, further comprising:
receiving a second selection of a second object of the objects as the dimension of the logical model; and
receiving a third indication of a third plurality of members of the second object to be associated with the dimension data of the logical model,
wherein the dimension table is associated with the second object and includes columns corresponding to the third plurality of members.

7. The method according to claim 1, further comprising:
determining, based on the plurality of relational database tables, a second object that is related to all other objects represented in the logical model; and
presenting the second object to the user as a primary data source for the fact data.

8. The method according to claim 1, further comprising:
determining, based on the plurality of relational database tables, a second object that is related to a greatest number of all other objects represented in the logical model; and
presenting the second object to the user as a primary data source for the fact data.

9. The method according to claim 1, wherein the class model represents assets and geographies of a manufacturing organization.

10. The method according to claim 1, wherein the tag-based data and non-tag-based data are derived from an industrial process.

11. The method according to claim 10, wherein the industrial process comprises a continuous process.

12. The method according to claim 10, wherein the industrial process comprises operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

13. The method according to claim 12, wherein the natural resource comprises at least one of oil and natural gas.

14. A system comprising:
an operations platform to provide a class-based model representing tag-based data and non-tag-based data and a plurality of objects instantiated based on the class model;
a database device to determine and store a plurality of relational database tables based on the class model and on the plurality of objects instantiated based on the class model; and
a schema generating device operating to:
after the database device determines the plurality of relational database tables, receive a selection of one object of the objects as a dimension of a logical model,
receive a first indication of a first plurality of members of the selected object to be associated with dimension data of the logical model,
receive a second indication of a second plurality of members of the selected object to be associated with fact data of the logical model,
create at least one dimension table after receiving the selection of the selected object, the at least one dimension table associated with the selected object and including a primary key column and columns corresponding to the first plurality of members, and create a fact table after receiving the selection of the selected object, the fact table including a foreign key column corresponding to each of the at least one dimension table, such that a plurality of dimension tables would result in a corresponding plurality of foreign key columns in the fact table, the fact table additionally including a column corresponding to each of the second plurality of members, a primary key of the at least one dimension table being placed in a record of the fact table within the foreign key column corresponding to the at least one dimension table.

15. The system according to claim 14, the schema generating device to receive a second selection of a second object of the objects as a second dimension of a logical model, to receive a third indication of a first plurality of members of the second object to be associated with dimension data of the logical model, to receive a fourth indication of a second plurality of members of the second object to be associated with fact data of the logical model, and to create a second dimension table associated with the second object and including columns corresponding to the first plurality of members of the second object, wherein the fact table includes a second foreign key column corresponding to the second dimension table and a column corresponding to each of the second plurality of members of the second object.

16. The system according to claim 15, the schema generating device to determine a mapping between at least one members of the selected object and at least one member of the second object.

17. The system according to claim 15, the schema generating device to determine a list of objects based on the selected object and the plurality of relational database tables, wherein the second object is selected from the list.

18. The system according to claim 14, wherein the dimension table includes a primary key column, and wherein the schema generating device is to create a function to receive values of one or more columns of the dimension table and to output a value of the primary key column of the dimension table, wherein the value identifies a row of the dimension table including the received values.

19. The system according to claim 14, wherein the class model represents assets and geographies of a manufacturing organization.

20. The system according to claim 14, the schema generating device to receive a second selection of a second object of the objects as the dimension of the logical model, and to receive a third indication of a third plurality of members of the second object to be associated with the dimension data of the logical model, wherein the dimension table is associated with the second object and includes columns corresponding to the third plurality of members.

21. The system according to claim 14, the schema generating device to determine, based on the plurality of relational database tables, a second object that is related to all other objects represented in the logical model, and to present the second object to the user as a primary data source for the fact data.

22. The system according to claim 14, the schema generating device to determine, based on the plurality of relational database tables, a second object that is related to a greatest number of all other objects represented in the logical model, and to present the second object to the user as a primary data source for the fact data.

23. The system according to claim 14, wherein the tag-based data and non-tag-based data are derived from an industrial process.

24. The system according to claim 23, wherein the industrial process comprises a continuous process.

25. The system according to claim 23, wherein the industrial process comprises operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

26. The system according to claim 25, wherein the natural resource comprises at least one of oil and natural gas.

27. The method of claim 1, wherein creating the dimension table after receiving the selection of the selected object comprises:

creating the dimension table after receiving the first indication of the first plurality of members.

* * * * *